(12) United States Patent
Hartner et al.

(10) Patent No.: US 11,718,413 B2
(45) Date of Patent: Aug. 8, 2023

(54) COCKPIT PEDESTAL AND AIRCRAFT WITH A COCKPIT PEDESTAL

(71) Applicant: BOMBARDIER INC., Dorval (CA)

(72) Inventors: Angela Hartner, Mont-Royal (CA); Horatiu Daniel Chiriac, Montreal (CA); Mohamed Hassan Elsharkawi, Laval (CA)

(73) Assignee: BOMBARDIER INC., Dorval (CA)

( * ) Notice: Subject to any disclaimer, the term of this patent is extended or adjusted under 35 U.S.C. 154(b) by 435 days.

(21) Appl. No.: 16/696,169

(22) Filed: Nov. 26, 2019

(65) Prior Publication Data

US 2020/0165002 A1     May 28, 2020

Related U.S. Application Data

(60) Provisional application No. 62/771,819, filed on Nov. 27, 2018.

(51) Int. Cl.
*B64D 43/00*      (2006.01)
*B64D 47/00*      (2006.01)
*B33Y 80/00*      (2015.01)

(52) U.S. Cl.
CPC ............. *B64D 43/00* (2013.01); *B64D 47/00* (2013.01); *B33Y 80/00* (2014.12)

(58) Field of Classification Search
CPC .... B64D 43/00; B64D 11/0015; B64D 47/00; B60R 2011/0007
See application file for complete search history.

(56) References Cited

U.S. PATENT DOCUMENTS

| | | | |
|---|---|---|---|
| D682,771 S | * | 5/2013 | Amante ........................ D12/345 |
| 9,731,823 B2 | * | 8/2017 | Guering ................. B64D 11/00 |
| 9,926,072 B2 | | 3/2018 | Collins et al. |
| 10,046,862 B2 | | 8/2018 | Sanders |

(Continued)

FOREIGN PATENT DOCUMENTS

| | | |
|---|---|---|
| DE | 102016222437 A1 | 5/2018 |
| DE | 102017201121 A1 | 7/2018 |

(Continued)

OTHER PUBLICATIONS

Ghobrial, "Lockheed Finds AM Sweet Spot", SME, 2018, https://www.sme.org/lockheed-finds-am-sweet-spot, accessed on Oct. 22, 2018, 8 pages.

(Continued)

*Primary Examiner* — Benjamin P Lee
(74) *Attorney, Agent, or Firm* — BCF LLP (57) ABSTRACT

A cockpit pedestal and an aircraft with a cockpit pedestal. The cockpit pedestal includes an integrally-formed frame including an instrument receiving portion defining a plurality of compartments for receiving instruments therein; and a plurality of legs supporting the instrument receiving portion, the plurality of legs being integrally formed with the instrument receiving portion, the plurality of legs being adapted for transferring a load of the plurality of instruments from the instrument receiving portion to a floor of the aircraft cockpit when the cockpit pedestal and the instruments are installed in the aircraft cockpit. In some versions the cockpit pedestal includes a conductive layer electrically grounding the instruments in the cockpit.

9 Claims, 5 Drawing Sheets

(56) References Cited

U.S. PATENT DOCUMENTS

| | | | |
|---|---|---|---|
| 10,081,431 B2 | 9/2018 | Seack et al. | |
| 2010/0090488 A1* | 4/2010 | Carnevali | B60R 11/02 |
| | | | 296/24.34 |
| 2010/0090490 A1* | 4/2010 | Carnevali | B60R 7/04 |
| | | | 296/193.04 |
| 2010/0140397 A1* | 6/2010 | Van Wassenhove | |
| | | | B64D 11/0689 |
| | | | 244/118.5 |
| 2011/0127380 A1* | 6/2011 | Orgerie | B64D 47/02 |
| | | | 244/118.5 |
| 2014/0042272 A1* | 2/2014 | Guering | B64D 11/00 |
| | | | 244/118.5 |
| 2016/0136891 A1 | 5/2016 | Benthien et al. | |
| 2017/0030941 A1 | 2/2017 | Sarno et al. | |
| 2017/0253316 A1 | 9/2017 | Benthien et al. | |
| 2017/0254065 A1 | 9/2017 | Hegenbart et al. | |
| 2017/0314959 A1* | 11/2017 | Chavez | B64D 43/00 |
| 2017/0355820 A1 | 12/2017 | Hu et al. | |
| 2018/0097288 A1* | 4/2018 | DiDomenico | G06V 20/56 |
| 2018/0286123 A1 | 10/2018 | Buck et al. | |
| 2020/0317101 A1* | 10/2020 | Matsumoto | B60R 7/04 |
| 2020/0319779 A1* | 10/2020 | Staggs | G06F 3/14 |
| 2020/0323096 A1* | 10/2020 | Tanguay | B64D 43/00 |

FOREIGN PATENT DOCUMENTS

| | | | | |
|---|---|---|---|---|
| EP | 3124375 B1 | 5/2018 | | |
| FR | 2939766 A1 * | 6/2010 | | B64D 11/00 |
| FR | 3059648 A1 | 6/2018 | | |
| WO | WO-2010069923 A1 * | 6/2010 | | B64D 11/00 |
| WO | WO-2012125436 A1 * | 9/2012 | | H05K 13/00 |
| WO | 2018/065159 A1 | 4/2018 | | |

OTHER PUBLICATIONS

"Interior—3D-printed functional lightweight components with maximum flexibility in product design", EOS, https://www.eos.info/industries_markets/aerospace/interior, accessed on Nov. 26, 2019, 2 pages.

Scott, "Airbus and Materialise 3D Print First Cabin Component to be Seen by Passengers", 3dprint.com, 2018 https://3dprint.com/209637/airbus-materialise-cabin-part/, accessed on Nov. 26, 2019, 5 pages.

"IlFlyTailies Creates Intricate RC Airplane Cockpits & Parts Using 3D Printing", 3dprint.com, https://3dprint.com/32632/3d-printed-rc-airplanes/, accessed on Nov. 26, 2019, 5 pages.

English Abstract for DE102016222437 retrieved on Espacenet on Nov. 26, 2019.

English Abstract for DE102017201121 retrieved on Espacenet on Nov. 26, 2019.

English Abstract for FR3059648 retrieved on Espacenet on Nov. 26, 2019.

* cited by examiner

COCKPIT PEDESTAL AND AIRCRAFT WITH A COCKPIT PEDESTAL

CROSS-REFERENCE

The present application claims priority from U.S. Provisional Application No. 62/771,819, filed on Nov. 27, 2018, the disclosure of which is incorporated by reference herein.

TECHNICAL FIELD

The present technology generally relates to aircraft and cockpit structures.

BACKGROUND

Cockpit pedestals in aircraft cockpits, also referred to as center consoles, are installed between co-pilots' seats to hold various instrumentation for operating the aircraft. These pedestals are fabricated from many metal compartments, each formed to hold one or more instruments. These compartments are then fastened or welded together to form the top supporting surface of the pedestal. The joined compartments are then fastened or welded to two large plates that form the lateral sides of the pedestal. The weight and loads from the compartments, and the instruments installed therein, is transferred through the large metal plates into the structure of the aircraft.

The process of connecting the various instrument-receiving compartments together and to the supporting plates is time and labor intensive. Due to the various shapes and weights of the different instruments to be installed in the pedestal however, each compartment needs to be specifically formed for its corresponding instrument(s).

There is therefore a desire for a cockpit pedestal without at least some of the inconveniences of previous cockpit pedestal designs.

SUMMARY

It is an object of the present technology to ameliorate at least some of the inconveniences present in the prior art.

In some aspects of the present technology, there is provided a cockpit pedestal with an integrally formed frame with load-bearing legs and an instrument receiving portion with integrally formed compartments. Exterior panels are fastened to the frame to cover the frame, but are not load-bearing. The frame is fabricated with additive manufacturing (also referred to as 3D printing). This allows the various compartments to be specifically designed to its corresponding instrument, while still being able to have the compartments being integrally formed into one piece. This reduces the number of pieces to be assembled, thus reducing assembly cost and time. Reduction in the number of fasteners and, in some cases, reduced material cost further reduces overall cost. Weight of the cockpit pedestal could also be reduced compared to previous versions due to the plastic used in the additive manufacturing, as well as the reduction in the number of fasteners and welds necessary. The use of load-bearing legs, in place of metal side support plates, could reduce overall weight. Rather than needing to use thick side panels to which a top portion would be fastened or welded, thin, light-weight panels fastened to the frame can be used. This has the advantage of using less material (reducing cost and weight), as well as allowing for the panels to be removed if desired to allow greater access the electronics and other components within the pedestal. The present technology further includes use of a conductive layer, in the form of a metal mesh or metallic thin film, applied to the plastic frame to provide a grounding connection for the instruments installed in the cockpit pedestal.

In one aspect of the present technology, there is provided a cockpit pedestal for supporting a plurality of instruments in an aircraft cockpit. The cockpit pedestal includes an integrally-formed frame including an instrument receiving portion defining a plurality of compartments for receiving the plurality of instruments therein; and a plurality of legs supporting the instrument receiving portion, the plurality of legs being integrally formed with the instrument receiving portion, the plurality of legs being adapted for transferring a load of the plurality of instruments from the instrument receiving portion to a floor of the aircraft cockpit when the cockpit pedestal and the plurality of instruments are installed in the aircraft cockpit.

In some embodiments, the cockpit pedestal further includes at least one cover panel connected to at least one lateral side of the frame, the at least one cover panel being a non-load bearing cover panel.

In some embodiments, the cockpit pedestal further includes at least one cover panel connected the frame, the at least one cover panel being a non-load bearing cover panel, the at least one cover panel covering an entirety of at least one side of the frame.

In some embodiments, the cockpit pedestal further includes a plurality of cover panels connected to and at least partially covering the frame.

In some embodiments, the plurality of legs define at least in part at least one access opening for accessing a space defined within the frame, the space being disposed below the instrument receiving portion.

In some embodiments, the cockpit pedestal further includes at least one access cover selectively covering the at least one access opening.

In some embodiments, the plurality of compartments includes at least one opening defined in the instrument receiving portion.

In some embodiments, the plurality of compartments includes at least one recess defined in the instrument receiving portion.

In some embodiments, the frame further includes a first side portion integrally connected to and supporting the instrument receiving portion, the first side portion including at least a first leg of the plurality of legs, the first side extending from the instrument receiving portion, and a second side portion integrally connected to and supporting the instrument receiving portion, the second side portion including at least a second leg of the plurality of legs, the second side extending from the instrument receiving portion the first and second side portions being disposed on opposite sides of the instrument receiving portion; and the frame has a generally upside-down-U shape.

In some embodiments, the cockpit pedestal further includes at least one conductive layer applied to at least a portion of the frame, the conductive layer being adapted for being electrically connected to the plurality of instruments.

In some embodiments, the frame is an additively manufactured frame.

In some embodiments, the frame is an insulating plastic frame.

In another aspect of the present technology, there is provided an aircraft including a fuselage including an aircraft cockpit; a cockpit pedestal according to any embodiment above, the cockpit pedestal being disposed in the aircraft cockpit; and a plurality of instruments received in and connected to the plurality of compartments of the cockpit pedestal.

In some embodiments, the cockpit pedestal is fastened to a floor of the aircraft cockpit.

In some embodiments, at least one of the plurality of legs of the cockpit pedestal is fastened to the floor.

In yet another aspect of the present technology, there is provided a cockpit pedestal for supporting a plurality of instruments in an aircraft cockpit. The cockpit pedestal includes an integrally-formed frame formed of a non-conductive material and defining a plurality of compartments for receiving the plurality of instruments therein, the plurality of instruments being connected to the frame when installed therein; and at least one conductive layer applied to at least a portion of the frame, the plurality of instruments being electrically connected to the conductive layer when installed in the frame, the conductive layer being electrically grounded in the aircraft cockpit when the cockpit pedestal is installed in an aircraft.

In some embodiments, the conductive layer is at least one metal mesh connected to at least a lateral side of the frame.

In some embodiments, the at least one metal mesh includes a first metal mesh connected to a first lateral side of the frame and a second metal mesh connected to a second lateral side of the frame, the second lateral side being oppositely disposed to the first lateral side.

In some embodiments, the cockpit pedestal further includes a plurality of electrical connecting elements connected between the at least one metal mesh and the plurality of compartments.

In some embodiments, the conductive layer comprises a layer of metal film applied to the frame.

In some embodiments, the layer of metal film is a sputtered metal thin film.

In some embodiments, the frame is an additively manufactured frame.

In some embodiments, the frame is an insulating plastic frame.

In yet another aspect of the present technology, there is provided an aircraft including a fuselage including an aircraft cockpit; a cockpit pedestal according to any embodiment above, the cockpit pedestal being disposed in the aircraft cockpit; and a plurality of instruments received in and connected to the plurality of compartments of the cockpit pedestal.

In yet another aspect of the present technology, there is provided a method of manufacturing a cockpit pedestal according to any of the above embodiments. The method includes forming by additive manufacturing the cockpit pedestal by an additive manufacturing machine.

In some embodiments, the method further includes, prior to forming the cockpit pedestal, receiving, by the additive manufacturing machine, printing instructions for the cockpit pedestal; and the forming the cockpit pedestal is based on the printing instructions.

In yet another aspect of the present technology, there is provided a computer readable medium storing computer readable instructions which, when acted upon by an additive manufacturing machine (3D printer), cause the additive manufacturing machine to print a physical object. The physical object is the cockpit pedestal according to any of the above embodiments.

In yet another aspect of the present technology, there is provided a non-transient digital representation of a physical object printable by additive manufacturing. The physical object is the cockpit pedestal according to any of the above embodiments.

For purposes of this application, terms related to spatial orientation such as top and bottom, should be understood in a frame of reference of an aircraft. Terms related to spatial orientation when describing or referring to components or sub-assemblies of the aircraft separately therefrom should be understood as they would be understood when these components or sub-assemblies are installed on the aircraft, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that the Figures are not necessarily drawn to scale and some details may not be represented.

DETAILED DESCRIPTION

The present technology will now be described in more detail with reference to the Figures.

Figure 1:
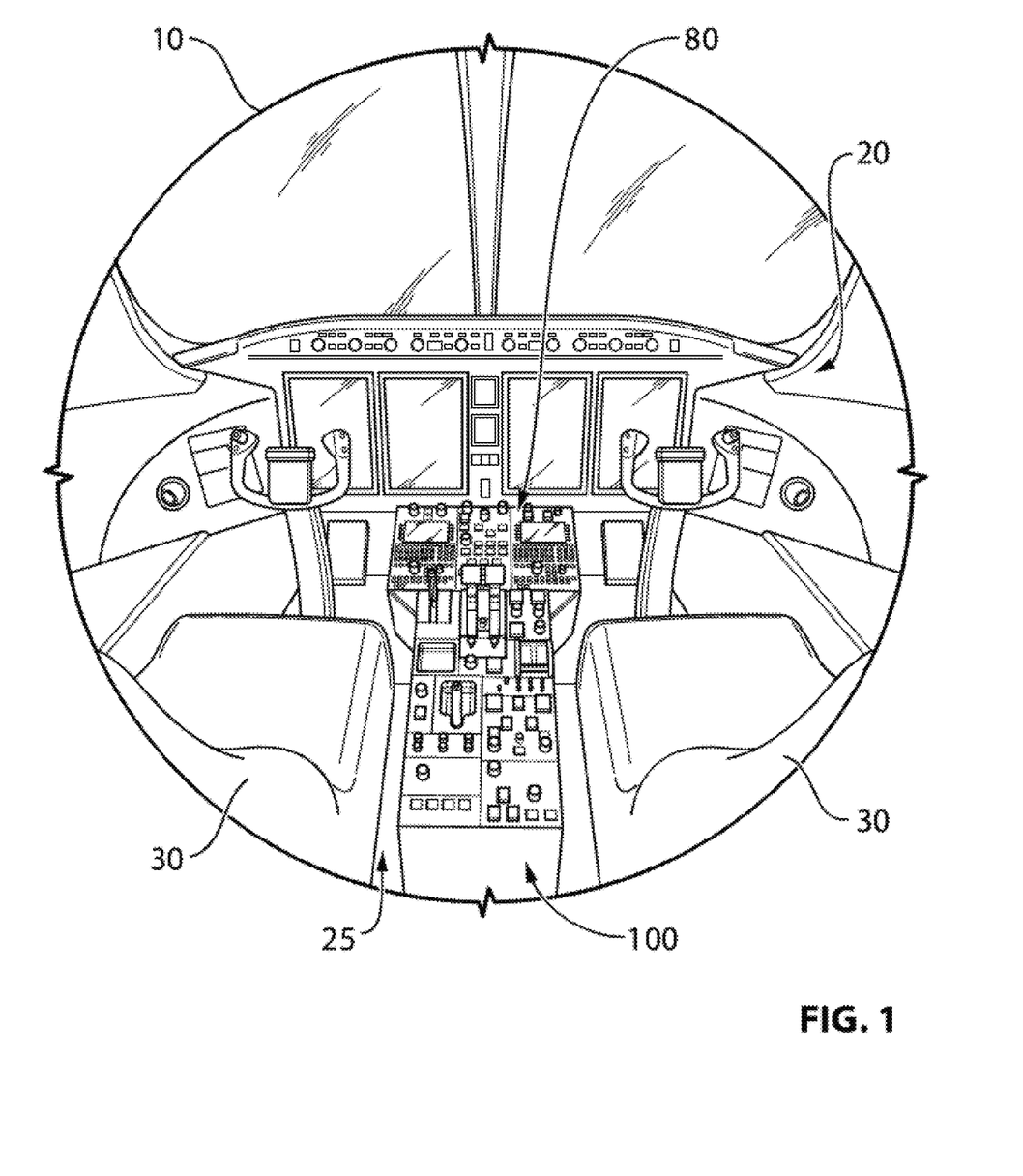
FIG. 1 is a rear perspective view of a cockpit in an aircraft.

With reference to FIG. 1, an aircraft cockpit 20 inside a fuselage 10 of an aircraft is illustrated. The cockpit 20 includes two seats 30 for co-pilots, although the cockpit 20 could include more or fewer seats 30. The cockpit 20 also includes a cockpit pedestal 100 disposed between the seats 30 and fastened to a floor 25 of the cockpit 20. The cockpit 20 also includes additional features such as a dashboard, windshield, etc., which will not be described in detail herein.

Figure 2:
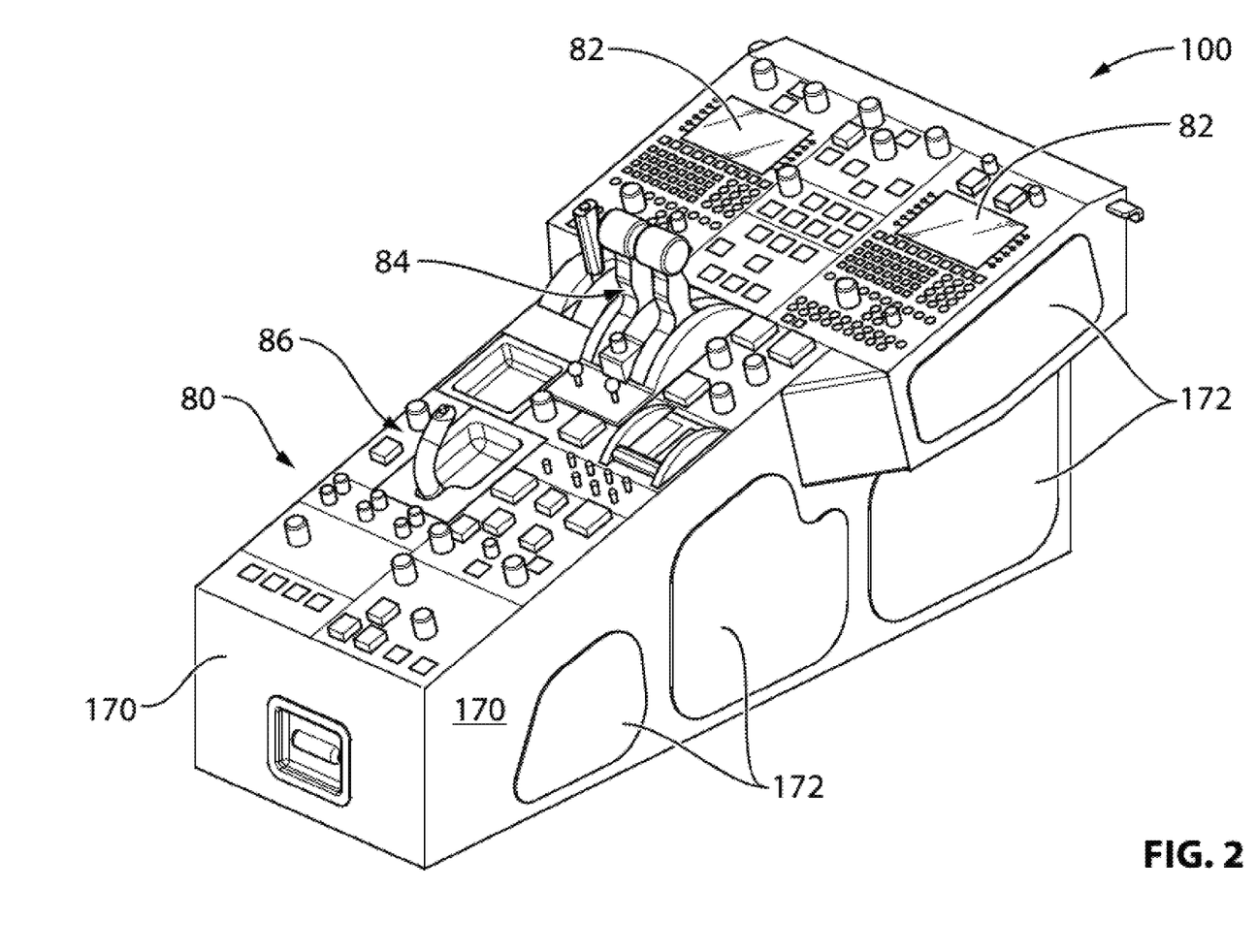
FIG. 2 is a top, rear, right side perspective view of a cockpit pedestal of the cockpit of FIG. 1.

The cockpit pedestal 100 is shown separately from the cockpit 20 in FIG. 2.

Sometimes referred to as a center console, the cockpit pedestal 100 supports a variety of instruments 80 for controlling the aircraft. While generally referred to as "instruments" herein, the instruments 80 could include any mechanical and/or electronic apparatus for presenting information to or receiving commands from operators. The instruments 80 could be present in the pedestal 100 in various forms, including but not limited to: screens, controllers, switches, interfaces, knobs, levers, buttons, dials, gauges, and handles. The instruments 80 are installed in and connected to the cockpit pedestal 100. As illustrated, the instruments 80 installed in the pedestal 100 include inter alia: the control display unit (CDU) 82, the throttle 84, and the parking/emergency brake 86. The cockpit pedestal 100 could further support various other instruments, including but not limited to: communication equipment, lighting, engine related controls, hydraulics, A/C, and flight control.

Figure 3:
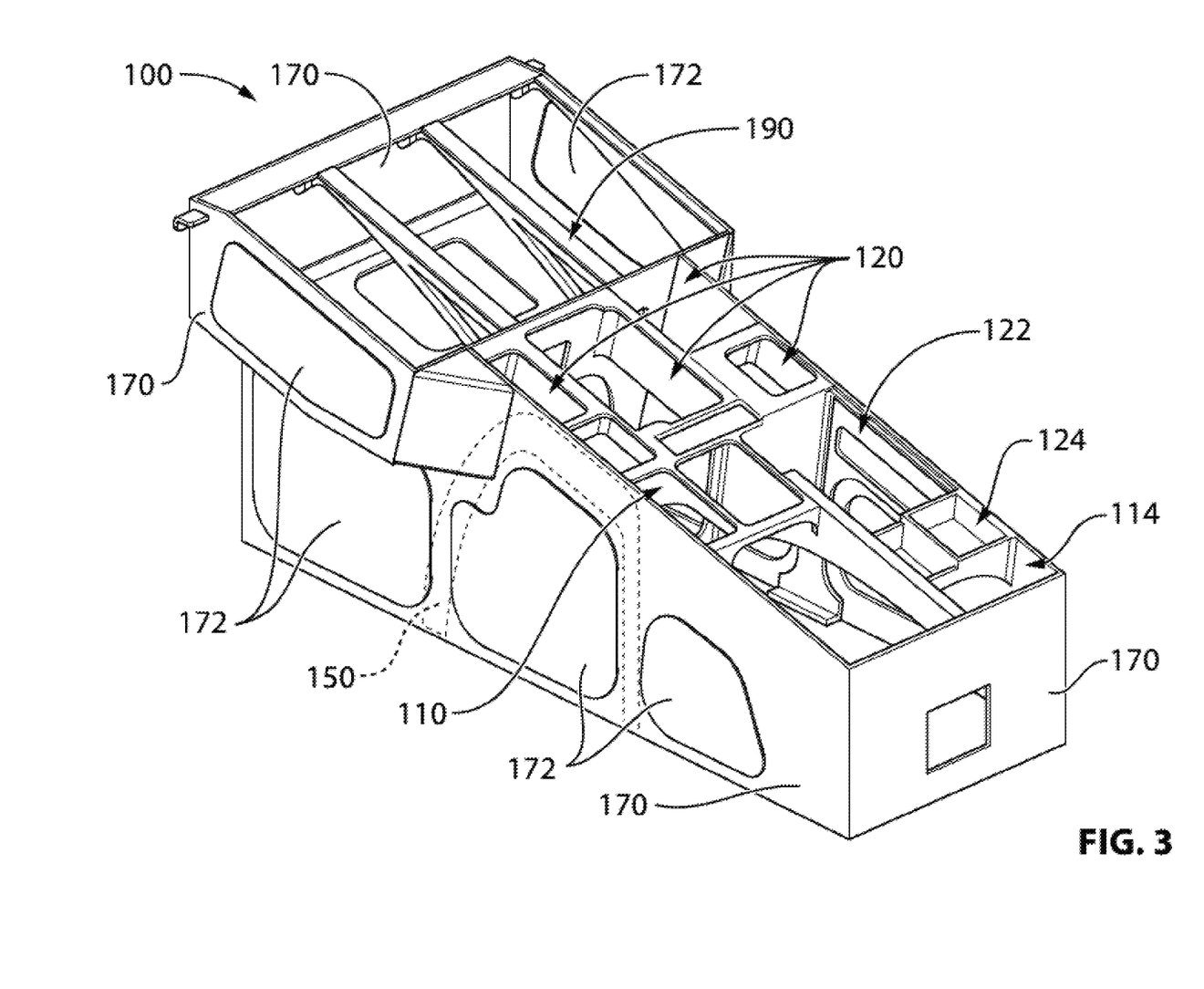
FIG. 3 is a top, rear, left side perspective view of the cockpit pedestal of FIG. 2, with instruments of the pedestal having been removed.
Figure 4:
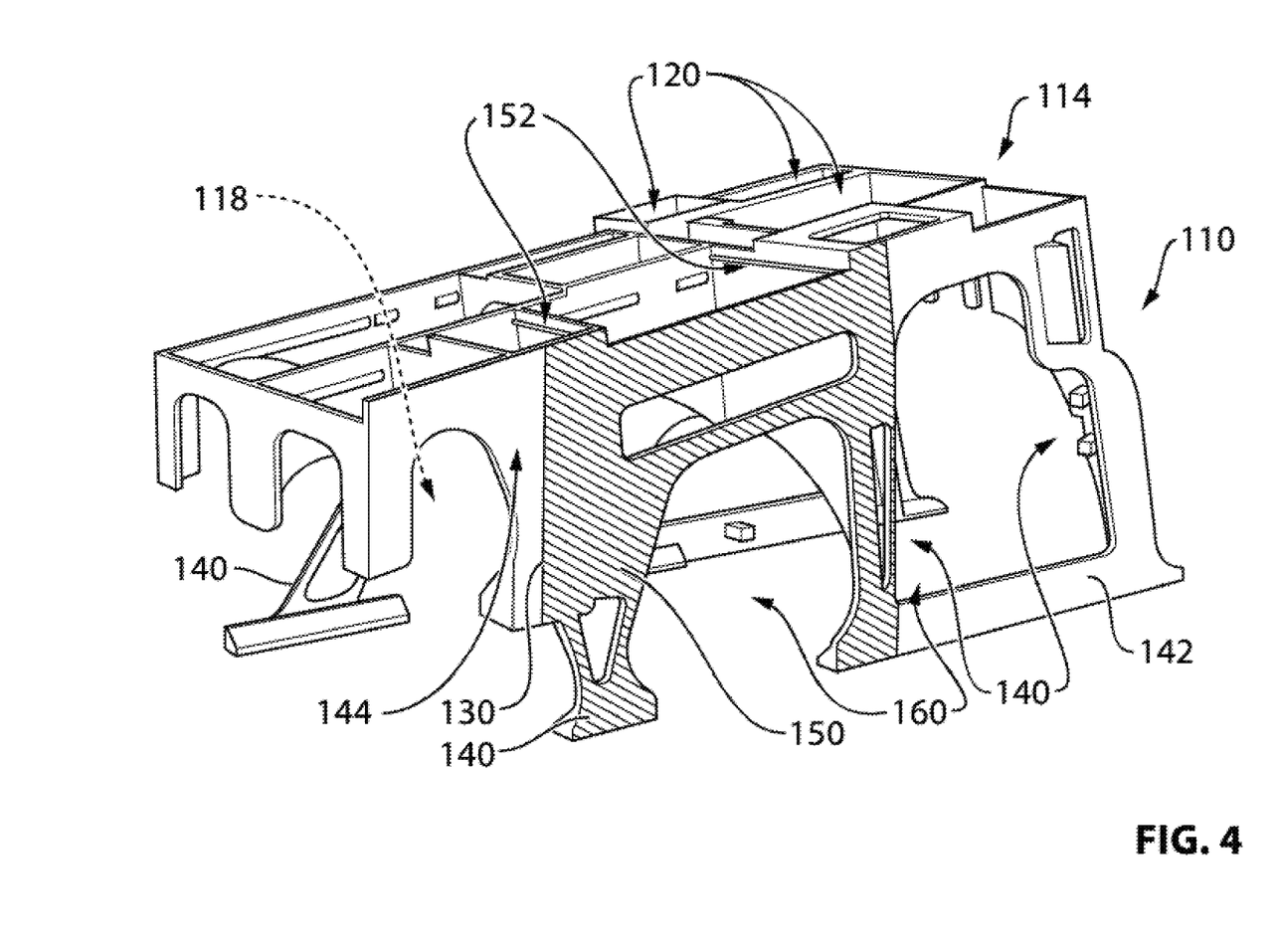
FIG. 4 is a top, rear, right side perspective view of a additively manufactured frame of the cockpit pedestal of FIG. 2.
Figure 5:
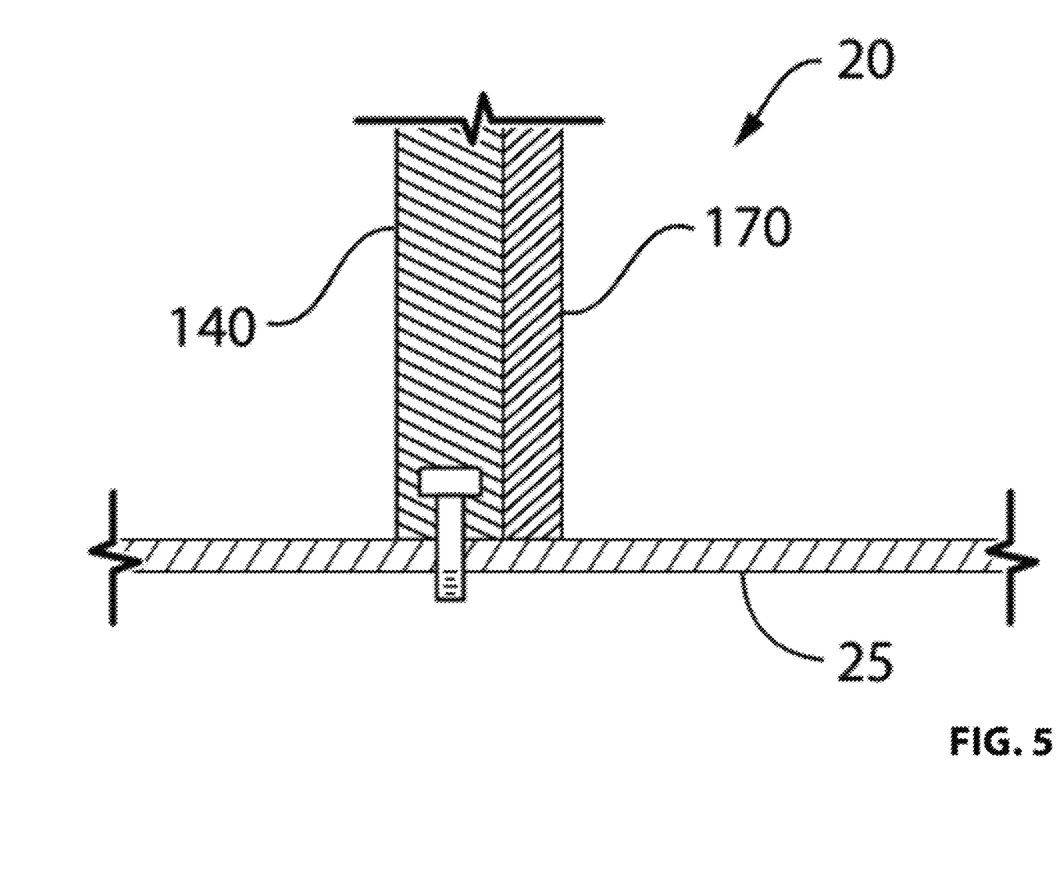
FIG. 5 is a schematic cross-section showing a connection between a leg of the pedestal and a floor of the cockpit of FIG. 1.

With further reference to FIGS. 3 to 5, components of the cockpit pedestal 100 will be described in further detail.

The cockpit pedestal 100 includes an integrally-formed frame 110, shown in isolation in FIG. 4. The various portions (described below) of the frame 110 are all integrally connected, such that the frame 110 is a single, unified part. The frame 110 is an additively manufactured frame 110, being fabricated using an additive manufacturing process (also referred to as three-dimensional or 3D printing). The illustrated embodiment is fabricated using an insulating plastic, specifically polyetherimide (for example Thermoplastic Ultem™ 9085) but the present technology is not limited thereto. Depending on the technology, different materials appropriate for additive manufacturing could be used to fabricate the frame 110, including but not limited to: various alloys, various plastics, and aluminum.

The frame 110 includes an instrument receiving portion 114. The instrument receiving portion 114 extends generally across and forms a top side of the frame 110. The instrument receiving portion 114 defines a plurality of compartments 120 for receiving the instruments 80 therein. Depending on the embodiment, there could more or fewer compartments 120 than illustrated.

The compartments 120 include both openings 122 and recesses 124 (FIG. 3). The placement, shape, size, and number of openings 122 and recesses 124 depend on the specific embodiment. The illustrated form and distribution of the compartments 120 in the Figures is simply one envisioned embodiment. Generally, each of the compartments 120 is designed and made to properly hold a corresponding one of the instruments 80 (or an instrument module including multiple instruments 80). It is contemplated that there could more or fewer openings 122 and recesses 124 in the instrument receiving portion 114 than illustrated. It is also contemplated that the compartments 120 could include only openings 122 or only recesses 124, and those in various locations compared to the illustrated embodiment.

The openings 122 are generally clear passages defined in the instrument receiving portion 114 through which the bulk of a given instrument 80 passes. The given instrument 80 is then supported in the corresponding opening 122 by the walls or edges surrounding the opening 122. Depending on the specific embodiment and instrument 80, the instrument 80 could be fastened or otherwise connected to the walls or edges surrounding the opening 122. It is also contemplated that the instrument 80 could be supported by a railing system. It is also contemplated that a front face of the given instrument 80 could include a border larger than the opening 122, such that the front face overlaps the surrounding edges thereby supporting the weight of the given instrument 80.

The recesses 124 are closed or partially closed recessed portions of the instrument receiving portion 114 into which some instruments 80 are installed. Depending on the specific embodiment and instrument 80, a given instrument 80 could be fastened or otherwise connected to the surfaces of the recess 124, such as a bottom surface of the recess or to walls or edges surrounding the bottom surface. It is also contemplated that an instrument 80 could be set into the recess 124 and held in place by the addition of a top surface cover panel, for example.

In the present embodiment, the cockpit pedestal 100 further includes a forward rack portion 190 for supporting additional instruments. The forward rack portion 190 is an integrally formed, additively manufactured rack for supporting additional instruments 80, including the CDU 82. The forward portion 190 is fastened to the frame 110, but it is contemplated that the forward rack portion 190 could be integrally formed with the frame 110 in some embodiments.

As is shown in FIG. 4, the frame 110 also includes two lateral side portions 130 integrally connected to and extending downward from the instrument receiving portion 114. The lateral side portions 130 are disposed on opposite sides of the instrument receiving portion 114 (the left and right sides in the present embodiment). The frame 110 is formed in a generally upside-down U shape, although the overall form could vary depending on specifics of the embodiment. The frame 110 defines therein a space 118, generally underneath the instrument receiving portion 114 and bounded on the left and right sides by the side portions 130. Electrical connections for the instruments 80 pass through the space 118 when installed in the pedestal 100, but depending on the embodiment, the space 118 within the frame 110 could be utilized for other purposes as well. While the frame 110 is generally open and allowing communication with the space 118 on the front and rear sides, it is contemplated that some embodiments of the frame 110 could also extend across all or a portion of the front and/or rear.

The left and right side portions 130 are differently shaped in the present embodiment, but it is contemplated that the two side portions 130 could be mirror-image designs in some embodiments. The specific shapes of the side portions 130 shown in FIG. 4 are simply one possible embodiment, and the form of the side portions 130 will generally depend on different factors, including the instruments 80 to be installed in the pedestal 100 and the form of the cockpit 20.

Each side portion 130 includes legs 140 for supporting the instrument receiving portion 114. In the specific embodiment shown in FIG. 4, each side portion 130 comprises three legs 140. Forming part of the side portions 130, the legs 140 extend generally downward from the instrument receiving portion 114. The legs 140 partially define (along with the cockpit floor 25) several access openings 160 for accessing the space 118 defined within the frame 110 via the left and right sides of the frame 110. When installed in the cockpit 20, the weight of the instruments 80 installed in the cockpit pedestal 100 is transferred from the instrument receiving portion 114 to the cockpit floor 25 via the legs 140. Therefore, the integrally formed frame 110 supports the load of the instruments 80 via the instrument receiving portion 114, and transfers that load to the cockpit floor 25 through the legs 140 of each side portion 130. As mentioned above, each side portion 130 is integrally formed with the instrument receiving portion 114.

The forward two legs 140 of each side portion 130 are joined at their bottom ends by a connecting portion 142, but the connecting portion 142 could be omitted in some embodiments. For example, the legs 140 may each individually connect to the cockpit floor 25 without any connecting structure (i.e. connecting portion 142) positioned between the legs 140 that runs along the cockpit floor 25. It is contemplated that the legs 140 could have different shapes, depending on specifics of a given embodiment. It is also contemplated that the frame 110 could include more or fewer legs 140. Each side portion 130 includes an intermediate solid portion 144 between the instrument receiving portion 114 and the legs 140, which aids in reinforcing the side portion 130. The intermediate solid portions 144 could be larger or smaller than in the illustrated embodiment. It is also contemplated that the intermediate solid portions 144 could be omitted and that the legs 140 could extend directly from the side edges of the instrument receiving portion 114 in some embodiments.

The cockpit pedestal 100 further includes two conductive layers 150 connected to the frame 110 for grounding the instruments 80 supported by the pedestal 100. As the pedestal frame 110 is formed from a non-conductive, insulating plastic material, an electrical connection between the instruments 80 and a grounding connection in the cockpit floor 25 is provided by the conductive layers 150.

The conductive layer 150 is applied to a central part of each of the side portions 130 in the present embodiment (shown schematically for the left side portion 130 in FIG. 3). It is contemplated that one or more areas of conductive layers 150 could be applied to any portion of one or both of the side portions 130. The layer 150 extends along the entire height of the side portions 130 in the illustrated embodiment, but the layer 150 needs simply to be electrically connected between the instruments 80 and a grounding connection in the cockpit 20. It is contemplated that one or more conductive elements, such as wires, could be included in the cockpit pedestal 100 in addition or in place of the conductive layers 150. It is also contemplated that some or all of the conductive layers 150 or other conductive elements connecting the instruments 80 and the grounding connection in the cockpit 20 could be connected to other portions of the cockpit pedestal 100.

In the present embodiment, the layers 150 are a copper mesh 150 adhered to an exterior side of the left and right side portions 130 of the frame 110. It is contemplated that the mesh 150 could be made from different conducting materials, including but not limited to different metals. It is also contemplated that the mesh 150 could be applied to either or both of the side portions 130, and could be applied to either the interior or exterior sides of the side portions 130. In some embodiments, the conductive layer 150 could be formed by applying a conductive thin film layer to all or some of one or both side portions 130. The conductive thin film layer could be formed by sputtering metal onto the frame 110 in some embodiments. It is also contemplated that the conductive film could be applied to the frame 110 by different methods, including for example cold spray deposition of a thin metallic layer or applying a metallic paint on the frame 110. It is also contemplated that the conductive layer 150 could be replaced by a series of conductive elements connected between the instruments 80 and the grounding connection in the cockpit 20. It is further contemplated that the conductive layer 150 could be separately formed with additive manufacturing and then connected to the frame 110.

The cockpit pedestal 100 also includes a plurality of electrical connections 152 extending from the compartments 120 to the mesh 150. The connections 152 in the present embodiment are metallic tape extending along surfaces of the instrument receiving portion 114, but other embodiments are contemplated. For example, the pedestal 100 could include electrical cables to connect the mesh 150 to the instruments 80.

The cockpit pedestal 100 also includes several cover panels 170 connected to and partially covering the frame 110. Different cover panels 170 are fastened to each of the side portions 130, as well as to the front and rear sides of the frame 110. As can be seen in the Figures, the cover panels 170 span an entire length of the left and right sides of the frame 110, from a front side to a rear side. One of the cover panels 170 also covers the rear side of the frame 110, spanning from the left to the right side. There is a similar cover panel 170 spanning the front side, but it is not illustrated for the present embodiment. It is contemplated that the panels 170 could cover more or less of the frame 110 than is illustrated. The cover panels 170 provide an aesthetic look to the pedestal 100 and aid in protecting the frame 110, as well as the space 118 and components therein (instrument wiring, etc.) from dust and unintentional interference. The frame 110 includes multiple clear holes, as manufactured, for rapid fastening of the panels 170 to the frame 110. It is contemplated that the holes for fasteners could be drilled into the frame 110 after manufacturing.

The cover panels 170 define openings (not separately shown) for accessing the space 118 within the frame 110. The openings in the cover panels 170 are aligned with the access openings 160 defined in the frame 110. The cover panels 170 include access covers 172 for selectively covering the openings in the cover panels 170 and the access openings 160. Upon selective removal of the access covers 172, the space 118 can be accessed. It is contemplated that one or more of the cover panels 170 could omit the access covers 172. Alternatively, the cover panels 170 do not define openings that are aligned with the access openings 160 defined in the frame 110, and are instead uninterrupted sheets of material. In such an embodiment, the overall cover panel 170 is removed from the frame 110 in order to gain access to the access openings 160 in the frame 110.

As is mentioned above, the weight and loads of the instruments 80 are borne by the frame 110, and more specifically by the legs 140. As such, it is the legs 140 that transfer the loads from the instruments 80 and compartments 120 to the cockpit floor 25. The cover panels 170 are thus non-load bearing panels 170. Because the load of the instruments 80 and the compartments 120 is borne by the frame 110, the cover panels 170 are fastened to the frame 110 and themselves selectively removable, for instance for greater access to the space 118. Further, the panels 170 are made of thin, light weight material, as the cover panels 170 are not load bearing. The cover panels 170 are contemplated to be aesthetic in nature, and not provide any structural support. Depending on the embodiment, the cover panels 170 could be made out of a variety of materials including, but not limited to, plastic, light weight metal, and composite materials. It is also contemplated that one or more of the panels 170 could include a metallic mesh to impede electrical interference.

The cockpit pedestal 100 is fastened to the cockpit floor 25 (e.g. structural frames or panels of the cockpit floor 25) when installed in the cockpit 20. Specifically, the legs 140 are bolted to the floor 25, as is illustrated schematically in FIG. 5. This enables the cover panels 170 and the access covers 172 to be selectively removable to allow access to the space 118 below the instrument receiving portion 114 without disconnecting the load bearing portions of the pedestal 100 from the cockpit 20 and without generally uninstalling the pedestal 100. It is contemplated that the legs 140 could be differently connected or fastened to the cockpit floor 25, depending on the specific embodiment.

According to the present technology, there is also a method of manufacturing the cockpit pedestal 100 by an additive manufacturing machine (also referred to as a 3D printer, as mentioned above). The method includes receiving, by the additive manufacturing machine, printing instructions for the cockpit pedestal 100. The printing instructions are generally a computer readable file which could be of a variety of forms. These could include, but are not limited to, CAD files and text files.

The method then includes the additive manufacturing machine forming the cockpit pedestal by additive manufacturing. Forming the cockpit pedestal is based on the printing instructions received by the additive manufacturing machine.

According to the present technology, there is also a computer readable medium storing a set of computer readable instructions, specifically the printing instructions described above. When acted upon by an additive manufacturing machine, the computer readable instructions cause the additive manufacturing machine (3D printer) to print a physical object. The physical object in this case is the cockpit pedestal 100. The computer readable medium could be implemented in a variety of different forms, including but not limited to: hard drives, compact discs, USB keys, cloud storage, and servers.

According to the present technology, there is also a non-transient digital representation of the cockpit pedestal 100. The non-transient digital representation of the cockpit pedestal 100 is printable by additive manufacturing. The non-transient digital representation can be stored or visualized using a variety of computational systems, including one or more of the implementations of the computer readable medium.

Modifications and improvements to the above-described embodiments of the present technology may become apparent to those skilled in the art. The foregoing description is intended to be exemplary rather than limiting.

What is claimed is:

1. A cockpit pedestal for supporting a plurality of instruments in an aircraft cockpit, the cockpit pedestal comprising:
    an integrally-formed frame including:
        an instrument receiving portion defining a plurality of compartments for receiving the plurality of instruments therein;
        a plurality of legs supporting the instrument receiving portion, the plurality of legs being integrally formed with the instrument receiving portion,
        a first side portion integrally connected to and supporting the instrument receiving portion, the first side portion including at least a first pair of legs of the plurality of legs, the first side extending from the instrument receiving portion, and
        a second side portion integrally connected to and supporting the instrument receiving portion, the second side portion including at least a second pair of legs of the plurality of legs, the second side extending from the instrument receiving portion, the first and second side portions being disposed on opposite sides of the instrument receiving portion, and
        said first pair of legs and said second pair of legs each forming generally upside-down-U shaped openings on said first and second side portions;
    the plurality of legs being adapted for transferring a load of the plurality of instruments from the instrument receiving portion to a floor of the aircraft cockpit when the cockpit pedestal and the plurality of instruments are installed in the aircraft cockpit, wherein the frame is formed by additive manufacturing.

2. The cockpit pedestal of claim 1, further comprising at least one cover panel connected to at least one lateral side of the frame, the at least one cover panel being a non-load bearing cover panel.

3. The cockpit pedestal of claim 1, further comprising at least one cover panel connected to the frame, the at least one cover panel being a non-load bearing cover panel, the at least one cover panel covering an entirety of at least one side of the frame.

4. The cockpit pedestal of claim 1, further comprising a plurality of cover panels connected to and at least partially covering the frame.

5. The cockpit pedestal of claim 1, wherein the plurality of legs define at least in part at least one access opening for accessing a space defined within the frame, the space being disposed below the instrument receiving portion.

6. The cockpit pedestal of claim 5, further comprising at least one access cover selectively covering the at least one access opening.

7. The cockpit pedestal of claim 1, wherein the plurality of compartments includes at least one opening defined in the instrument receiving portion.

8. The cockpit pedestal of claim 1, wherein the plurality of compartments includes at least one recess defined in the instrument receiving portion.

9. The cockpit pedestal of claim 1, further comprising at least one conductive layer applied to at least a portion of the frame, the at least one conductive layer being adapted for being electrically connected to the plurality of instruments.

* * * * *